United States Patent
King

(10) Patent No.: US 7,378,615 B1
(45) Date of Patent: May 27, 2008

(54) STEERING WHEEL HEATING APPARATUS

(76) Inventor: Jason A. King, 1323 SE. 17th St., PMB317, Ft. Lauderdale, FL (US) 33316

( * ) Notice: Subject to any disclaimer, the term of this patent is extended or adjusted under 35 U.S.C. 154(b) by 25 days.

(21) Appl. No.: 11/423,640

(22) Filed: Jun. 12, 2006

(51) Int. Cl.
  *B62D 1/06* (2006.01)
  *H05B 3/34* (2006.01)
(52) U.S. Cl. .................................... 219/204
(58) Field of Classification Search ............... 219/204, 219/535, 528, 544, 546, 552, 534, 202, 529; 74/552
  See application file for complete search history.

(56) References Cited

U.S. PATENT DOCUMENTS

| | | | |
|---|---|---|---|
| 2,848,712 A * | 8/1958 | Preston | ....................... 180/272 |
| 4,549,069 A | 10/1985 | Oge | |
| 5,294,775 A * | 3/1994 | Carrier | ........................ 219/204 |
| D395,629 S | 6/1998 | Moore, Jr. | |
| 6,114,668 A | 9/2000 | Ogata et al. | |
| 6,392,195 B1 | 5/2002 | Zhao et al. | |
| 6,441,344 B1 | 8/2002 | Bonn et al. | |
| 6,512,202 B2 | 1/2003 | Haag et al. | |
| 6,727,467 B1 * | 4/2004 | Hadzizukic et al. | ........ 219/204 |
| 6,815,642 B2 | 11/2004 | Haag et al. | |

\* cited by examiner

*Primary Examiner*—J. Pelham

(57) ABSTRACT

A steering wheel heating apparatus includes a steering wheel that includes an annular member and a pair of supports that are attached to and extend inwardly from the annular member. Each of the supports is attached to a steering column of a vehicle. A covering is removably positioned on and is coextensive with the annular member. At least one elongated heating element extends along a length of the covering. The elongated heating element is positioned between a top side and a bottom side of the covering. A power supply is electrically coupled to the heating element. An actuator is electrically coupled to the power supply and is configured to selectively turn the heating element on or off.

8 Claims, 3 Drawing Sheets

STEERING WHEEL HEATING APPARATUS

BACKGROUND OF THE INVENTION

1. Field of the Invention

The present invention relates to steering wheel covering devices and more particularly pertains to a new steering wheel covering device for selectively heating the steering wheel during cold weather.

2. Description of the Prior Art

The use of steering wheel covering devices is known in the prior art. While these devices fulfill their respective, particular objectives and requirements, the need remains for a device that may be retrofitted to existing steering wheels and which includes a heating means for selectively heating the steering wheel.

SUMMARY OF THE INVENTION

The present invention meets the needs presented above by generally comprising a steering wheel that includes an annular member and at least two supports that are attached to and extend inwardly from the annular member. Each of the supports is attached to a steering column of a vehicle. A covering is removably positioned on and is coextensive with the annular member. At least one elongated heating element extends along a length of the covering. The elongated heating element is positioned between a top side and a bottom side of the covering. A power supply is electrically coupled to the heating element. An actuator is electrically coupled to the power supply and is configured to selectively turn the heating element on or off.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
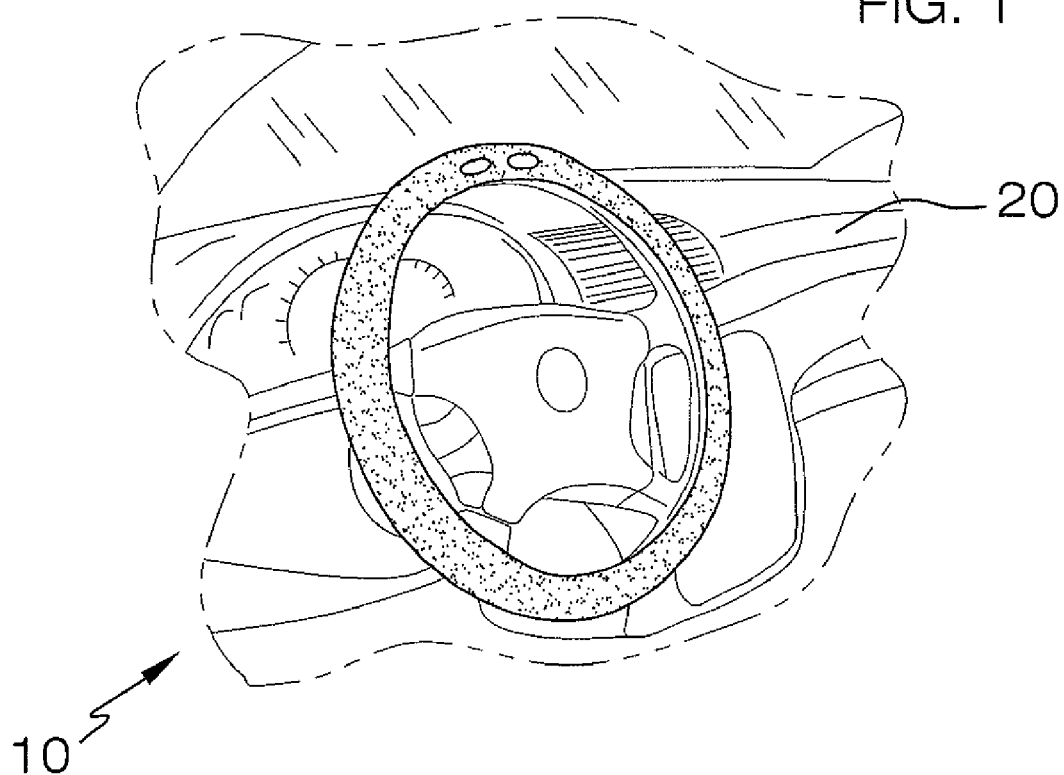
FIG. 1 is a perspective in-use view of a steering wheel heating apparatus according to the present invention.

With reference now to the drawings, and in particular to FIGS. 1 through 8 thereof, a new steering wheel covering device embodying the principles and concepts of the present invention and generally designated by the reference numeral 10 will be described.

As best illustrated in FIGS. 1 through 8, the steering wheel heating apparatus 10 generally comprises a steering wheel 12 that includes an annular member 14 and at least two of supports 16 that are attached to and extend inwardly from the annular member 14. Each of the supports 16 is attached to a steering column 18 of a vehicle 20.

A covering 22 is removably positioned on and is coextensive with the annular member 14. The covering 22 comprises a panel 24 forming a loop and having a pair of outer edges 26. The panel 24 includes a bottom layer 28 abutting the annular member 14. The bottom layer 28 comprises an insulating material. The panel 24 includes a top layer 30 comprising a leather material. The panel 24 includes an internal layer 32 positioned between the top 30 and bottom 28 layers. The internal layer 32 comprises a resiliently compressible material. A pair of resiliently stretchable bands 34 is provided. Each of the outer edges 26 has one of the bands 34 attached thereto. The bands 34 are coextensive with a respective one of the outer edges 26.

Figure 2:
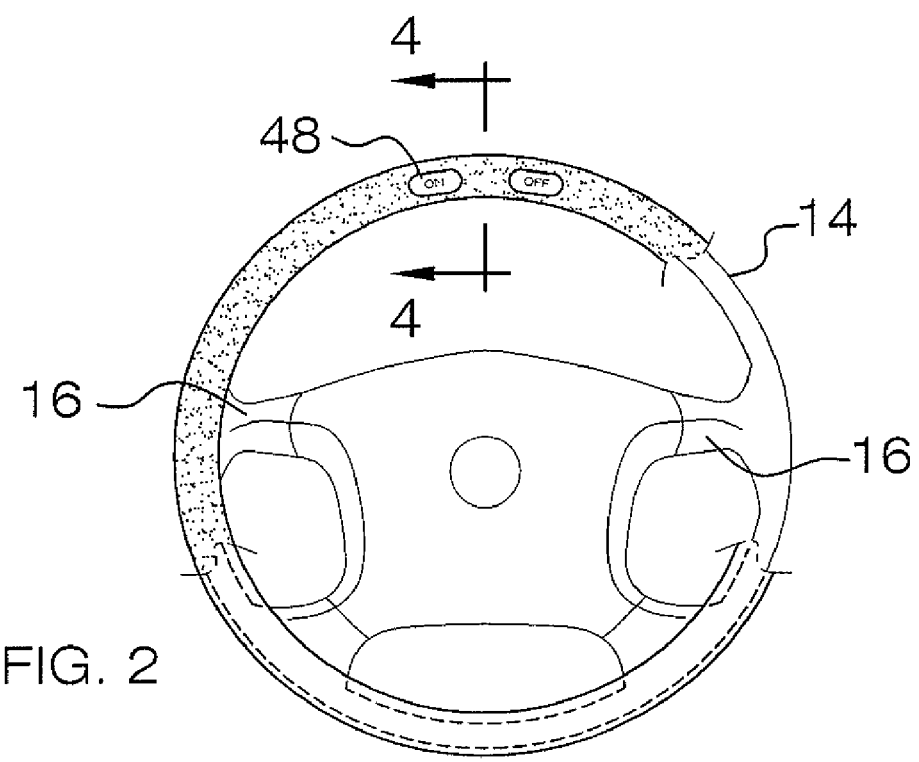
FIG. 2 is a front view of the present invention.
Figure 3:
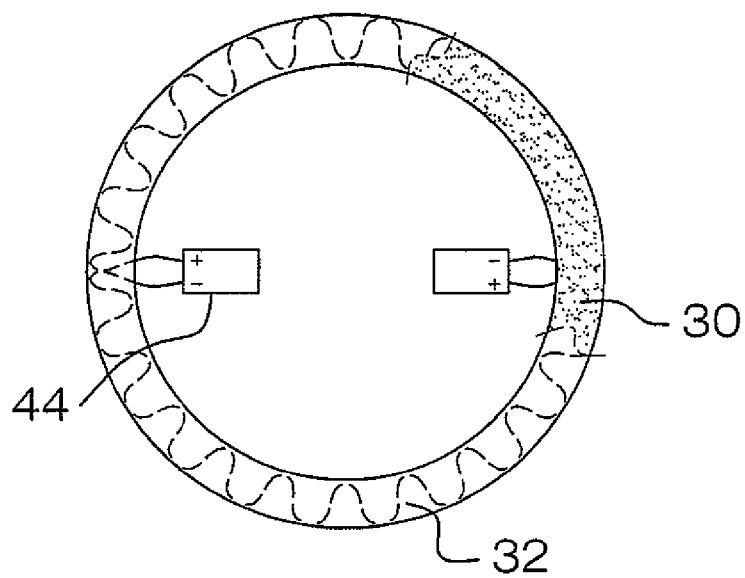
FIG. 3 is a front broken view of the present invention.
Figure 4:
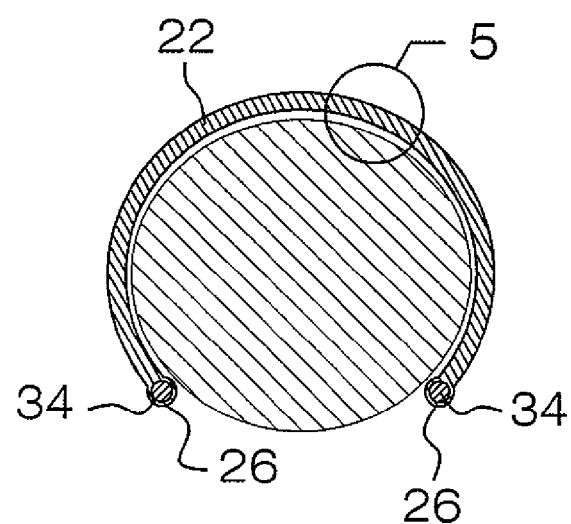
FIG. 4 is a cross-sectional view taken along line 4-4 of FIG. 2 of the present invention.
Figure 5:
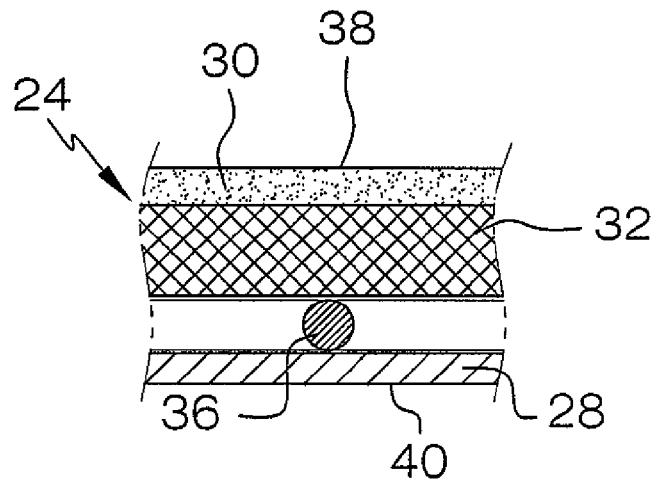
FIG. 5 is an enlarged view of area "5" of FIG. 4 of the present invention.
Figure 6:
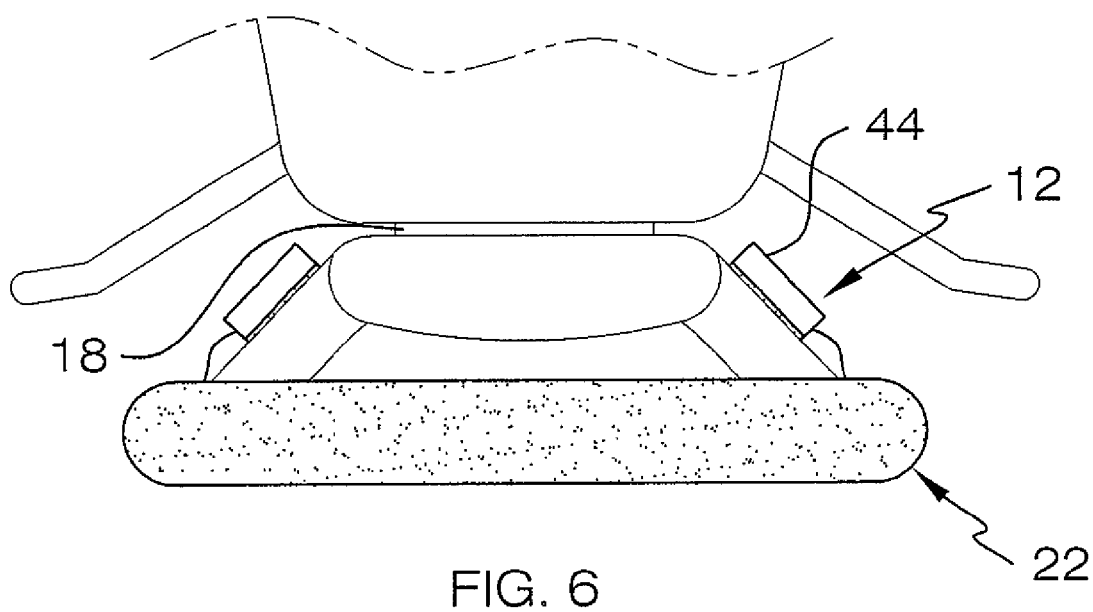
FIG. 6 is a top view of the present invention.
Figure 8:
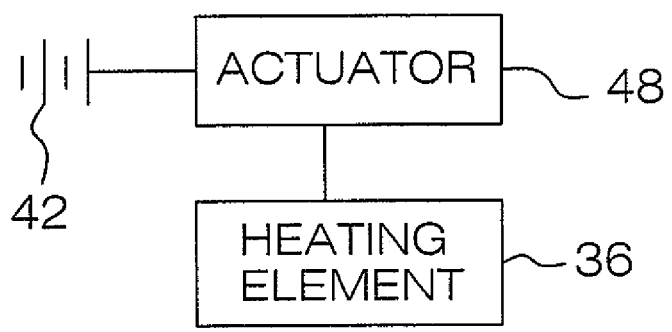
FIG. 8 is a schematic view of a battery housing of the present invention.
Figure 7:
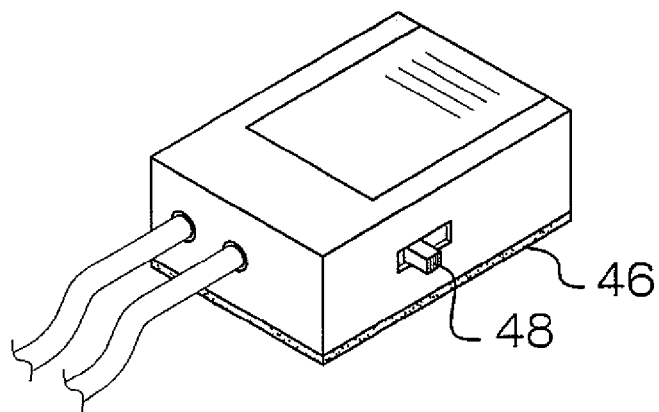
FIG. 7 is a perspective view of a battery housing of the present invention.

At least one elongated heating element 36 extends along a length of the covering 22. The elongated heating element 36 is positioned between a top side 38 and a bottom side 40 of the covering 22. The heating element 36 is positioned between the top 30 and bottom 28 layers. A power supply 42 is electrically coupled to the heating element 36. The power supply 42 comprises at least one battery positioned in at least one battery housing 44. A securing member 46 is attached to the at least one battery housing 44 and secures the at least one battery housing 44 to one of the supports 16. The securing member 46 comprises an adhesive. An actuator 48 is electrically coupled to the power supply 42 and is configured to selectively turn the heating element 36 on or off. The actuator 48 is mounted on the covering 22 as shown in FIG. 2. FIG. 7 shows the actuator 48 being positioned on the at least one battery housing 44.

In use, the covering 22 is positioned over the annular member 14. When a user of the steering wheel 12 wishes to warm the annular member 14, the actuator 48 is turned on and the heating element 36 heats the covering 22 to warm the hands of the user when the covering 22 and annular member 14 is gripped.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heating system comprising:
   a steering wheel including an annular member and at least two supports being attached to and extending inwardly from said annular member, each of said supports being attached to a steering column of a vehicle;
   a covering being removably positioned on and being coextensive with said annular member;
   at least one elongated heating element extending along a length of said covering, said elongated heating element being positioned between a top side and a bottom side of said covering;
   a power supply being electrically coupled to said heating element, said power supply comprising at least one battery positioned in at least one battery housing;
   a securing member being attached to said at least one battery housing and securing said at least one battery housing to one of said supports; and
   an actuator being electrically coupled to said power supply and being configured to selectively turn said heating element on or off.

2. The system according to claim 1, further including:
   wherein said covering comprises a panel forming a loop and having a pair of outer edges; and
   a pair of resiliently stretchable bands, each of said outer edges having one of said bands attached thereto, said bands being coextensive with a respective one of said outer edges.

3. The system according to claim 2, wherein said panel includes bottom layer abutting said annular member, said bottom layer comprising an insulating material, said panel including a top layer comprising a leather material.

4. The system according to claim 3, wherein said panel includes an internal layer positioned between said top and bottom layers, said internal layer comprising a resiliently compressible material.

5. The system according to claim 3, wherein said heating element is positioned between said top and bottom layers.

6. The system according to claim 1, wherein said securing member comprises an adhesive.

7. The system according to claim 1, wherein said actuator is mounted on said covering.

8. A heating system comprising:
   a steering wheel including an annular member and at least two of supports being attached to and extending inwardly from said annular member, each of said supports being attached to a steering column of a vehicle;
   a covering being removably positioned on and being coextensive with said annular member, said covering comprising a panel forming a loop and having a pair of outer edges, said panel including a bottom layer abutting said annular member, said bottom layer comprising an insulating material, said panel including a top layer comprising a leather material, said panel including an internal layer positioned between said top and bottom layers, said internal layer comprising a resiliently compressible material;
   a pair of resiliently stretchable bands, each of said outer edges having one of said bands attached thereto, said bands being coextensive with a respective one of said outer edges;
   at least one elongated heating element extending along a length of said covering, said elongated heating element being positioned between a top side and a bottom side of said covering, said heating element being positioned between said top and bottom layers;
   a power supply being electrically coupled to said heating element, said power supply comprising at least one battery positioned in at least one battery housing, a securing member being attached to said at least one battery housing and securing said at least one battery housing to one of said supports, said securing member comprising an adhesive; and
   an actuator being electrically coupled to said power supply and being configured to selectively turn said heating element on or off, said actuator being mounted on said covering.

* * * * *